(12) United States Patent
Eymard et al.

(10) Patent No.: US 8,243,195 B2
(45) Date of Patent: Aug. 14, 2012

(54) CADENCE DETECTION IN A SEQUENCE OF VIDEO FIELDS

(75) Inventors: Frankie Eymard, Sassenage (FR); Christophe Barnichon, Sassenage (FR)

(73) Assignee: STMicroelectronics S.A., Montrouge (FR)

( * ) Notice: Subject to any disclaimer, the term of this patent is extended or adjusted under 35 U.S.C. 154(b) by 1223 days.

(21) Appl. No.: 11/761,184

(22) Filed: Jun. 11, 2007

(65) Prior Publication Data

US 2007/0296858 A1    Dec. 27, 2007

(30) Foreign Application Priority Data

Jun. 13, 2006 (FR) .................................. 06 05254

(51) Int. Cl.
*H04N 7/01* (2006.01)
*H04N 11/20* (2006.01)

(52) U.S. Cl. ........ 348/441; 348/448; 348/449; 348/452; 348/459; 348/700

(58) Field of Classification Search .................. 348/448, 348/449, 452, 459, 700, 701
See application file for complete search history.

(56) References Cited

U.S. PATENT DOCUMENTS

| | | | | |
|---|---|---|---|---|
| 5,828,786 A * | 10/1998 | Rao et al. | ....................... | 382/236 |
| 6,031,927 A * | 2/2000 | Rao et al. | ....................... | 382/100 |
| 6,040,875 A | 3/2000 | Boice et al. | | |
| 6,055,018 A * | 4/2000 | Swan | ........................... | 348/448 |
| 6,480,232 B1 | 11/2002 | Wilson | | |
| 6,542,199 B1 | 4/2003 | Manbeck et al. | | |
| 6,940,557 B2 | 9/2005 | Handjojo et al. | | |
| 7,075,581 B1 * | 7/2006 | Ozgen et al. | ................... | 348/448 |
| 7,129,990 B2 * | 10/2006 | Wredenhagen et al. | ...... | 348/449 |
| 7,203,238 B2 * | 4/2007 | Liu et al. | ................... | 375/240.17 |
| 7,349,029 B1 * | 3/2008 | Chou | ............................ | 348/448 |
| 7,391,468 B2 * | 6/2008 | Shah | ............................ | 348/441 |
| 7,405,766 B1 * | 7/2008 | Chou et al. | ................... | 348/448 |
| 7,528,887 B2 * | 5/2009 | Wyman | ......................... | 348/452 |
| 7,561,206 B2 * | 7/2009 | Munsil et al. | .................. | 348/558 |
| 7,605,866 B2 * | 10/2009 | Conklin | ......................... | 348/448 |
| 7,612,828 B2 * | 11/2009 | Winger et al. | .................. | 348/449 |
| 7,800,692 B2 * | 9/2010 | Wredenhagen et al. | ...... | 348/449 |
| 7,808,552 B1 * | 10/2010 | Wang et al. | .................... | 348/449 |
| 2002/0135697 A1 * | 9/2002 | Wredenhagen et al. | ...... | 348/448 |
| 2002/0171759 A1 | 11/2002 | Handjojo et al. | | |
| 2005/0162547 A1 * | 7/2005 | Kuroda et al. | ................. | 348/448 |
| 2005/0168652 A1 * | 8/2005 | Wyman | ......................... | 348/700 |

(Continued)

FOREIGN PATENT DOCUMENTS

EP    0720366    7/1996

(Continued)

OTHER PUBLICATIONS

French Search Report re FR 0605254 dated Apr. 25, 2007.

*Primary Examiner* — Brian Yenke (74) *Attorney, Agent, or Firm* — Gardere Wynne Sewell LLP (57) ABSTRACT

A method for cadence detection in a sequence of video fields is based on at least a search for cadence patterns in a sequence of bits representative of the motion in at least a part of the field from one field to another in the field sequence. The signaling of field skip and/or field repeat commands as applied to the fields in the field sequence is considered during the cadence detection operation so as to field skips and repeats.

20 Claims, 4 Drawing Sheets

U.S. PATENT DOCUMENTS

| | | | |
|---|---|---|---|
| 2005/0168653 A1* | 8/2005 | Wyman | 348/700 |
| 2006/0146187 A1 | 7/2006 | Handjojo et al. | |
| 2006/0187341 A1* | 8/2006 | Fuji | 348/441 |
| 2007/0002169 A1* | 1/2007 | Munsil et al. | 348/446 |
| 2007/0052846 A1* | 3/2007 | Adams | 348/452 |
| 2007/0139552 A1* | 6/2007 | Jia et al. | 348/448 |
| 2007/0188662 A1* | 8/2007 | Winger et al. | 348/701 |
| 2007/0258014 A1* | 11/2007 | Doswald | 348/701 |
| 2007/0291169 A1* | 12/2007 | Eymard et al. | 348/452 |
| 2008/0002055 A1 | 1/2008 | Caviedes et al. | |
| 2008/0158414 A1* | 7/2008 | Capps | 348/448 |
| 2011/0013081 A1* | 1/2011 | Wredenhagen et al. | 348/449 |

FOREIGN PATENT DOCUMENTS

| | | |
|---|---|---|
| EP | 1592250 | 11/2005 |
| WO | WO-91/06182 | 5/1991 |

\* cited by examiner

CADENCE DETECTION IN A SEQUENCE OF VIDEO FIELDS

PRIORITY CLAIM

The present application is a translation of and claims priority from French Patent Application No. 06 05254 of the same title filed Jun. 13, 2006, the disclosure of which is hereby incorporated by reference to the maximum extent allowable by law.

BACKGROUND OF THE INVENTION

1. Technical Field of the Invention

The present invention relates to detecting the cadence of a sequence of video fields.

2. Description of Related Art

The detection of the cadence of a sequence of video fields is based on a search for a cadence pattern, for example "10010", in a sequence of bits representative of the motion between one field and another. The cadence of a field sequence is understood to mean a repeat of at least one cadence pattern in the sequence of bits representative of the motion between one field and another. Cadence detection may allow one to find the source format of a sequence of video fields, or detect the absence of motion between frames (still pictures).

Several source formats exist. For example, a video camera may capture 50 or 60 frames per second. Film format allows filmed images to be captured at a rate of 24 or 25 frames per second. The number of frames per second may be even smaller, for example about 8 frames per second for some Japanese animation.

There are also multiple display formats. The PAL standard (Phase Alternating Line), primarily used in Europe, displays 50 fields per second. The NTSC format (National Television Standards Committee), primarily used in the United States, displays 60 fields per second.

The standards commonly used in television specify encoding the source frames into successive interlaced fields (half a frame), where fields containing the even lines of pixels in a given frame for display are interlaced, or in other words alternate, with fields containing only the odd lines of pixels in a next frame for display. More generally, an image is subdivided into one field, two fields, or even more, depending on the scanning mode. In this document, the term "field" covers a complete image, half of an image, and even smaller fractions of an image. A "sequence of video fields" is understood not to be limited to the video format in particular, but simply indicates that a field corresponds to a frame or a portion of a frame.

Thus, when a sequence of frames in film format at 25 frames per second is encoded in the PAL format at 50 Hz, each film frame is subdivided into two interlaced fields. In another example, when a sequence of video frames at 50 frames per second is encoded in the PAL standard, each frame is reduced into an alternating even and odd field containing half a frame. In another example, when a sequence of frames in film format at 24 frames per second is encoded in the NTSC format at 60 fields per second, each sequence of four consecutive film frames is converted into a sequence of ten fields containing half a frame. In these ten fields, the first three come for example from the same film frame, the next two fields come from a second film frame, etc. Thus, two of the first three fields are identical. Such a conversion is called a 3:2 pulldown.

Other types of conversion also exist. There is the 2:2 pulldown which converts a film format of 24 or 25 frames per second to the PAL format at 50 Hz, the 2:3 pulldown which converts a 24 frames per second format to an NTSC format, the 3:2:3:2:2 pulldown when a television station eliminates one field out of twelve in a sequence originating from film frames, 2:2:2:4 and 2:3:3:2 conversions for frames captured in a DVCAM format, 5:5, 6:4 or 8:7 conversions for frames of animated cartoons, etc.

Cadence detection is based on comparisons of pixels belonging to successive fields of index n, performed in order to determine the existence of motion between one frame and another. A conversion typically leads to abrupt motion variations. For example, in a 3:2 pulldown, three fields n−3, n−2, n−1, originate from the same film frame, so no motion is detected between these fields. The next two fields n, n+1 originate from another film frame. Relatively substantial motion may be detected between the third field n−1 and the fourth field n, while the motion between the fourth field n and the fifth field n+1 is essentially zero. By analyzing a sequence of bits representative of the motion, called a motion sequence, determined by comparisons of pixels in a field sequence, one may identify a repeating pattern and thus detect that a conversion has been performed. Cadence detection is therefore based on an analysis of motion sequences.

Cadence detection may be used in a variety of applications. For example, a cadence detector may be combined with a deinterlacing device or a compression device. If a particular cadence is detected, the processing may be done relatively simply, for example by the simple merging of fields in the case of deinterlacing.

In addition to conversion, the fields of a frame sequence may be repeated and/or skipped in a more or less regular rhythm. In particular, it may be necessary to adapt the scanning parameters of a source format to a display format. Scanning parameters include such characteristics as the number of fields for a frame (typically one or two), the number of lines per frame, the number of lines in an odd field and in an even field, the number of active lines per frame, the number of samples per line, the number of active samples per line, the sampling rate, the line rate, the field rate, a phase difference between vertical and horizontal synchronizing signals, etc.

To adapt these scanning parameters from a source format to a display format, fields may be regularly repeated or skipped. This is called scan format conversion. For example, to adapt a format of 50 fields per second to a format of 60 fields per second, a field may be repeated every five fields. For other source and/or display formats, for example a source format of 59.95 fields per second and a display format of 60 fields per second, the data steam may be regulated using a control loop.

More generally, there are numerous types of image processing, for example, to improve contrast or quality or to perform deinterlacing. These lead to the temporary storage of image data in buffers. Here again, a flow control loop may be used to control the flow of data into buffers and avoid overflow in particular.

A flow control loop allows tying some or all of these parameters to the desired format. Control commands are used, for example, clock control commands to affect the sampling rate, or line control commands to control the number of lines scanned per field by affecting the line rate, for example. Control commands may also comprise field control commands in order to repeat or skip a field. These operations at the field level may occur when the flow control loop is in a non-steady state, to accelerate the establishing of a steady state. A flow control loop may thus lead to irregular field repeats/skips. Fields may therefore be skipped or repeated, for the purposes of regulating the data stream in particular.

Field skips and repeats affect cadence detection. For example, in a sequence of fields resulting from a 3:2 pulldown, a motion sequence such as "100101001010010 . . ." is expected. Skipping the third field results in the motion sequence "10101001010010 . . .", which corresponds to a 2:2 pulldown for the first six fields. A repeat of the third field results in the motion sequence "1000101001010010 . . .". In these two cases, there is a risk of incorrectly detecting a break in the cadence, or even erroneously detecting a cadence.

There is a need in the art to eliminate the effects of field skips or repeats on cadence detection.

SUMMARY OF THE INVENTION

In a first embodiment, a method is presented for detecting the cadence of a sequence of video fields, based on at least one search for a cadence pattern in a sequence of bits representative of the motion in at least a part of a field between one field and another in a field sequence. The method uses a signaling of skip and/or repeat commands previously applied to the fields of a frame sequence. The use of such a signaling of these commands allows a cadence detection which is relatively unaffected by any field skips or repeats. This method is conventionally applied to each field in the sequence. However, it may instead be applied periodically, for example at a frequency of one field out of ten.

The method may use a signaling of field skip commands only. Alternatively, it may use a signaling of field repeat commands only. In yet another alternative, it may use a signaling of both field skip and repeat commands.

It is advantageous to use one signal for signaling field skip commands, and another signal for signaling field repeat commands. These signals may be binary. Alternatively, a single signal may be used with at least three levels for example, to signal both field repeat commands and field skip commands.

The signaling of field skip and/or repeat commands may, for example, comprise the signaling of field control commands. A field control command results in repeating or detecting a field in the field sequence for the purposes of stream regulation, and is applied by a flow control loop.

Signaling may also comprise a signaling of regular field skip commands and/or regular field repeat commands, performed, for example, for the purposes of a scan format conversion. For example, to adapt a format of 50 fields per second to a format of 60 fields per second, a regular field repeat command may be applied to the field sequence every five fields.

Of course, the method is not limited by these examples of signaling field skip and/or repeat commands.

The cadence detection method typically comprises, for each current field in the field sequence, a comparison of each pixel in the current field with at least one pixel in at least one previous field. These comparisons allow assigning to each pixel in the current field a motion phase value for the pixel. These values may be used to determine a motion phase value for at least a part of the field. This value is used to update a history of motion phase values for this field or part of the field in the field sequence. Each history thus comprises a sequence of bits representative of the motion of at least a part of a field between one field and another. This history is searched for one or more cadence patterns. For this purpose, bitstreams are generated for each cadence pattern to be searched for, with each bitstream corresponding to a phase of the cadence pattern. The history is compared to each cadence bitstream. If there is a match with a bitstream, the cadence pattern corresponding to this bitstream is considered to have been detected. For simplicity, the expression "motion phase" will be used to indicate a motion phase value.

The history may comprise a sequence of bits representative of the motion of the complete field. This achieves a field based cadence detection.

Alternatively, multiple histories may be used to perform multiple detection for each field, for example a detection for each block of 80×80 pixels in the field. In this case multiple field-based searches for cadence patterns may be conducted.

In particular, a displayed image may be created from several combined sources. This is the case when subtitles are overlaid on a film frame sequence, or when the frame is partitioned in order to highlight specific areas, for example variations in stock prices or graphs. The fields of a given sequence may therefore comprise zones emanating from different sources, for example a film zone which has undergone a 3:2 pulldown and a video zone directly captured at 60 frames per second. In addition, certain compression algorithms apply encoding such that a 2:2 conversion may be locally introduced. In these cases, locally performed cadence detection may avoid erroneous detection in certain zones of the image.

For example, each part of a field may comprise a block of pixels, so that the detection is block-based (block-based cadence detection). Alternatively, each part of a field may comprise a region comprising blocks in which the same cadence has been detected, or an object when the definition of an object is that the pixels of the same object move according to the same motion model in these images. The method is therefore not limited by the part of the field in which the detection is performed.

The signaling of field skip and/or repeat commands may be used during the step when the history or histories is/are updated. For example, a field repeat flag may be set to logic "1" when there is a field repeat command: if this flag is act, updating the history is prevented until the next field.

In another example, if a skip command is signaled, the history or histories are shifted by one bit, then an arbitrary value such as zero (logic "0") is written into the space or spaces thus freed. Alternatively, if a cadence has been detected for a history, the expected motion phase value for the field or part of the field may be written.

Of course, the signaling may be used prior to updating the history. For example, if the field repeat flag is set, no pixel comparison is performed for the current field, nor are any other steps resulting in updating one or more histories.

The signaling of field skip and/or repeat commands may be used during steps which compare a history to bitstreams. For example, the history or histories are updated without yet considering the field repeat flag. If the flag is set, then during comparisons to bitstreams the bit corresponding to the repeated field in each history is considered to have a match. All bitstreams are then shifted by one bit in order to reflect the repeat command.

In another example, if a skip command is signaled, then during comparisons to bitstreams there is considered to be a match for the bit corresponding to the skipped field in each bitstream. All bitstreams are then shifted.

Alternatively, if a skip command is signaled, one bit may be deleted from each bitstream generated and then the comparisons made.

In general, the method is not limited by the manner in which the signaling of field skip and/or repeat commands is used during the cadence detection.

In a second embodiment, a cadence detection device is provided for detecting the cadence of a sequence of video fields, comprising searching means for searching a cadence pattern in a sequence of bits representative of the motion of at least a part of a field between one field and another in the field sequence. This cadence detection device uses a signaling of field skip and/or repeat commands previously applied to the fields in the field sequence.

The device may, for example, comprise motion phase detection means for determining a motion phase value for each current field or part of the current field, as well as a detection control unit for updating the history or histories, with this unit connected to the cadence pattern search means. The device may also comprise a memory for storing shared registers, in particular comprising the history or histories. The detection control unit, the memory, and/or the cadence pattern search means may be arranged to receive and process a signaling of field skip and/or repeat commands.

In a third embodiment, a processing system comprises, in addition to the device according to the second embodiment, a processing device coupled to the cadence detection device. The processing device may, for example, comprise a deinterlacing device, a compression device, or some other device.

The processing system may comprise a flow control loop for adapting the format of the frame sequence to a reference format. The flow control loop is arranged to generate field control commands to be applied to the fields in the frame sequence, and the cadence detection device is arranged to receive the signaling of these field control commands.

Of course, the signaling of field skip and/or repeat commands is not limited to the signaling of field control commands.

In a fourth embodiment, a television set incorporates a processing system according to the third embodiment.

In a fifth embodiment, a digital television decoder (set top box) incorporates a processing system according to the third embodiment.

Alternatively, the processing system may of course be incorporated into other devices.

BRIEF DESCRIPTION OF THE DRAWING

Other features and advantages will become apparent upon reading the description that follows the description hereinbelow of a non-limiting exemplary embodiment(s), making reference to the appended drawings, in which.

DETAILED DESCRIPTION OF THE DRAWINGS

Figure 1:
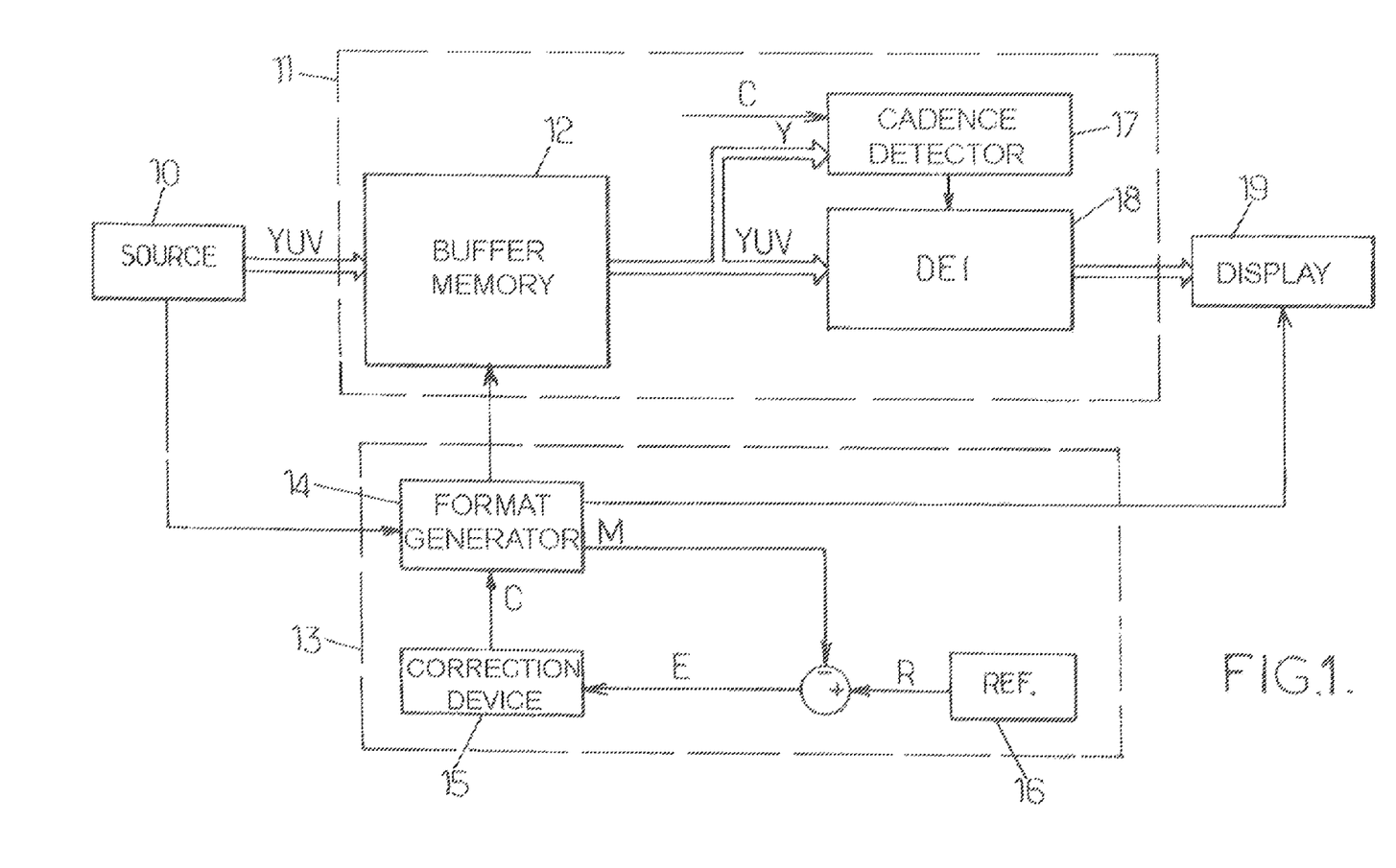
FIG. 1 schematically shows an example of a processing system according to one embodiment.

FIG. 1 shows an example of a processing system. In FIGS. 1 to 4, the video streams are represented by thick arrows, while the control signals are represented by thin arrows.

A sequence of interlaced fields issuing from a source 10 is received by an image processing unit 11 which, for example, deinterlaces the frames in the sequence. The image data corresponding to this field sequence are stored temporarily in a buffer 12. A flow control loop 13 may be used to control the flow of data into the buffer and in particular to avoid exceeding the buffer capacity (overflow).

The flow control loop 13 comprises a format generator 14 controlled by a command vector C. A measurement vector M is compared to a reference vector R issuing from a reference format generator 16. A correction device 15 allows determining the command vector C from the result of the comparison.

The command vector C comprises control commands, for example clock control commands or line control commands. The control commands may also comprise field control commands, which load to repeating or skipping a field.

The system represented in FIG. 1 also comprises a cadence detector 17 and a processing device 18, for example a deinterlacing device or DEI.

In the embodiment illustrated, only the luminance pixels Y (luma pixels) are used by the cadence detector 17. Alternatively, a more complex and reliable motion detection could be implemented on the basis of comparisons of chrominance pixels (chroma pixels).

The cadence detector 17 is arranged to use part of the command vector C, meaning possible field control commands present. In this manner the cadence detector 17 may, for example, receive the command vector C as input.

The detector 17 transmits data to the deinterlacing device 18, typically a detected cadence pattern if there is one. In this manner, if a conversion from a film format is detected for example, the sequence may be reconstructed relatively easily by merging two successive fields which initially corresponded to the same film frame.

The deinterlaced sequence is then received by a display device 19.

All or part of the processing system in FIG. 1 may be integrated into a television set or a decoder for example.

Figure 2:
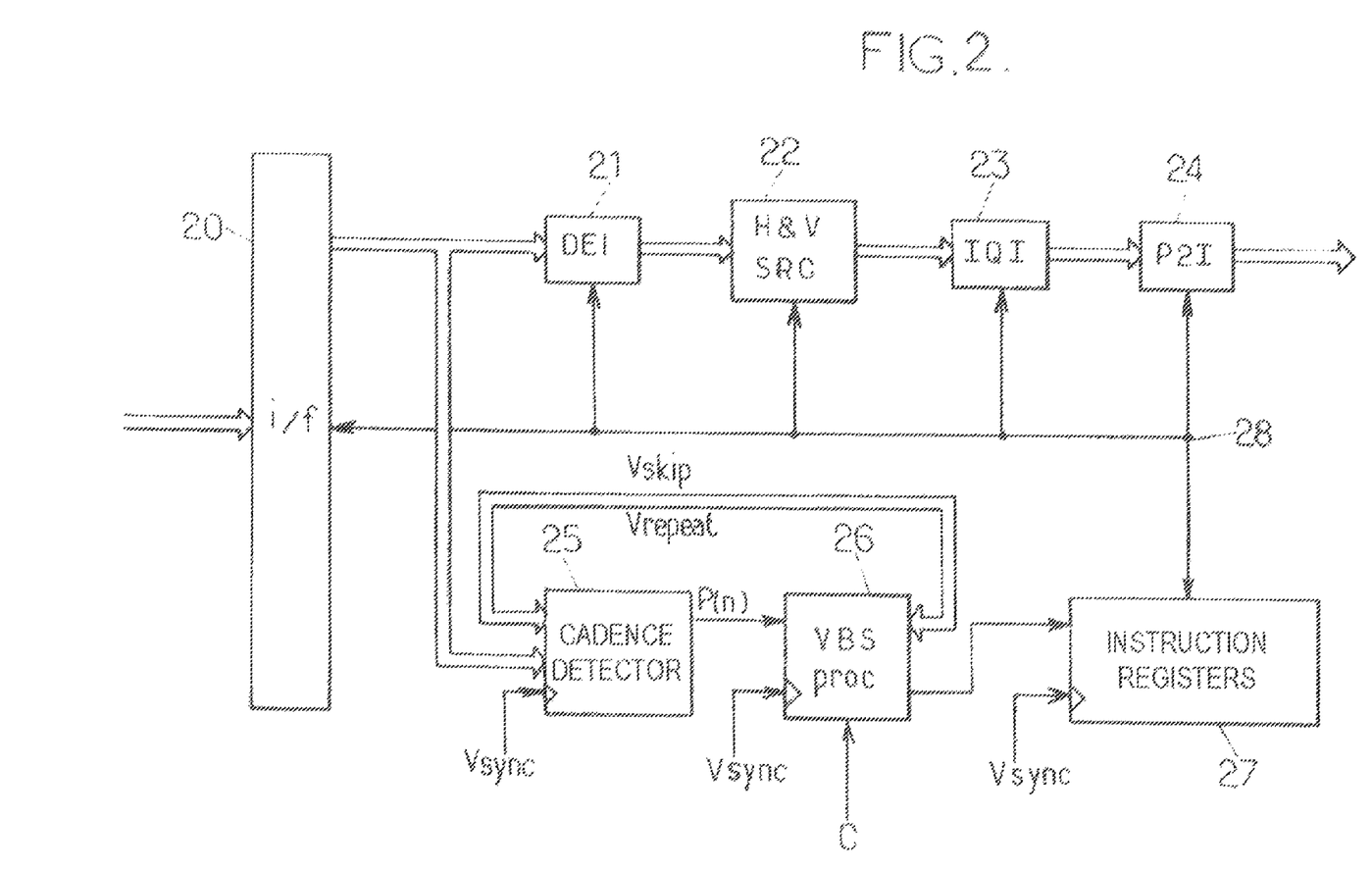
FIG. 2 schematically shows an example of processing system according to another embodiment.

Another example of a processing system is shown in FIG. 2: a deinterlacing device 21 or DEI converts a sequence of video fields form an interlace format with 480 lines per frame (denoted "480i") to a progressive format (denoted "480p"). A sample rate converter 22 or H&V SRC (for "sample rate converter" or "rescaler") converts to a progressive format with 1080 lines per frame (denoted "1080p"). The processing system also comprises an image quality improvement device 23 or IQI. An interlacing device 24 or P2I ("progressive to interlace") converts to an interlaced format with 1080 lines per frame (denoted "1080i").

The deinterlacer 21 uses two fields or more to reconstruct a complete frame. The video stream is temporarily stored in a buffer accessible to the interface 20. The stored data are addressed by a bus 28.

The bus 28 is controlled by instruction registers 27, which in turn are controlled by a VBS ("video buffer sequence") processor 26 comprising a logic controller. If a cadence detector 25 comprising a cadence pattern search means detects a conversion, for example a 2:2 pulldown, the logic controller of the processor 26 interprets microcode, stored for example in a table (not represented) and corresponding to the detected conversion, in order to a create a VBS sequence. The VBS sequence comprises sequences of field indices which must be addressed by the bus 28 so that the deinterlacing is performed in an optimal manner by the DEI 21.

The devices 25, 26 and 27 are synchronized by a vertical synchronization signal Vsync.

The VBS processor 26 thus stores a table for each detectable conversion. If the number of fields per second also must be converted from 50 to 60, the table comprises one or more regular field repeat instructions. Thus, at regular intervals the bus 28 addresses the same fields twice in order to convert to 60 fields per second.

However, the fields received by the interface 20 are also used by the cadence detector 25. The VBS processor 26 applies field repeat commands prior to the cadence detection.

The cadence detector 25 is arranged to receive as input a signal Vrepeat comprising an indication of a field repeat command from the VBS processor 26. Use of the Vrepeat signal avoids erroneous cadence detections due to regular field repeats.

The cadence detector 25 is additionally arranged to receive as input a signal Vskip indicating field skip commands. If, for example, the number of fields per second must be converted from 60 to 50, the cadence detector takes into account the field skip commands from the VBS processor 26.

The VBS processor 26 may also accept as input a control signal C originating from a flow control loop (not represented in FIG. 2). The VBS processor interprets the flow control commands in order to adapt the field addressing sequence and generate the Vrepeat and Vskip signals. The Vrepeat and Vskip signals thus respectively indicate the field repeat commands and the field skip commands, not only from the VBS processor 26, but also from the flow control loop.

All or part of the processing system in FIG. 2 may be integrated into a television set or a decoder for example.

Figure 3:
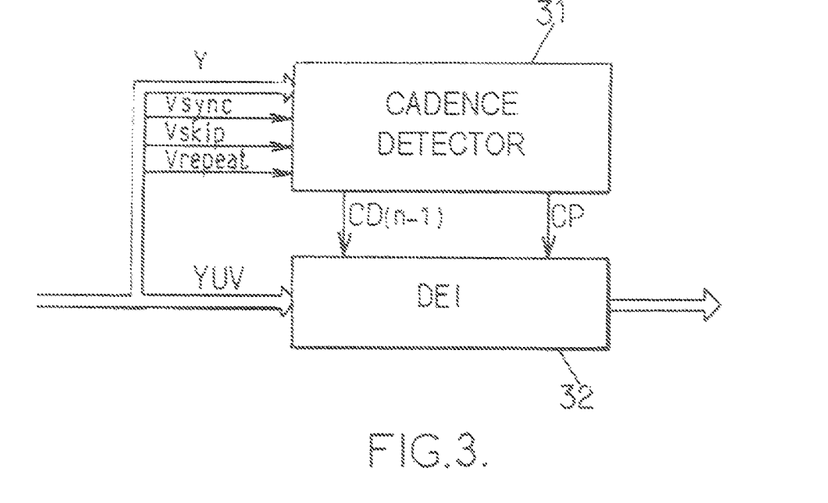
FIG. 3 schematically shows an example of a processing system according to one embodiment.

Another example of a processing system for processing a sequence of interlaced fields is shown in FIG. 3. The system comprises a cadence detector 31 and a deinterlacing device 32. The cadence detector of the invention may of course be used in other applications. For example, the cadence detector may be connected to a compression device to allow detecting redundant fields and thus contribute to an efficient compression.

The cadence detector 31 comprises a vertical synchronization input for receiving a vertical synchronization signal Vsync indicating the transition from field to field.

The cadence detector 31 also comprises an input for field repeat commands, for receiving the signaling of field repeat commands previously applied to the fields in the sequence. This signaling comprises a Vrepeat signal.

The cadence detector 31 also comprises an input for field skip commands, for receiving the signaling of field skip commands previously applied to the fields in the sequence. This signaling comprises a Vskip signal.

The Vrepeat and Vskip signals may be binary, with a logic "1" indicating repeat command and a skip command respectively.

The cadence detector 31 may transmit to the DEI 32 a cadence pattern (CP) detected for a field or a part of a field, and status data (or CD(n−1), where CD stands for "cadence data").

Figure 4:
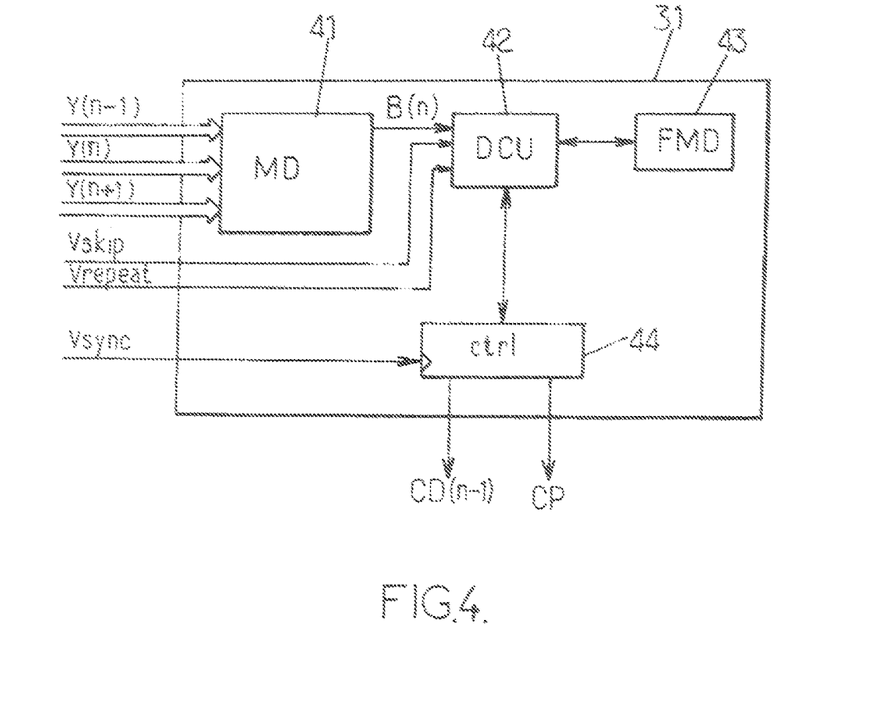
FIG. 4 schematically shows in more detail the cadence detector illustrated in FIG. 3.

Cadence detector: FIG. 4 shows in more detail the cadence detector 31 represented in FIG. 3. The cadence detector 31 comprises a motion detector 41 or MD receiving as input the current Y(n), previous Y(n−1) and next Y(n+1) luminance fields. In the embodiment illustrated in FIG. 4, the cadence detection is by block (block-based cadence detection). The fields are subdivided into blocks of 16×8 pixels, meaning that the corresponding frames are divided into blocks of 16×16 pixels. This conventional compression format is 16×16 pixels, so the user is accustomed to seeing artifacts appear at the boundaries of blocks of this size. In addition, zones originating from different sources often share the same boundaries with this conventional subdivision into blocks of 16×16 pixels. This limits the number of blocks which overlap multiple zones. Of course, the invention is not limited by the size of the blocks. Thus, the motion detector 41 determines a block motion phase value B(n) for each block in the current field.

The cadence detector 31 additionally comprises a detection control unit 42 or DCU. The DCU 42 performs a cadence detection for each block by using the cadence data and cadence patterns stored in the registers of a control unit 44. These registers are shared by the DCU 42 and a film mode detector 43 or FMD. Some of the registers for storing cadence data are double-buffered registers synchronized to the vertical synchronization signal VSync. One may update a register during the processing of the current field n and simultaneously use the value of this register for the previous field n−1. For some of the registers which store cadence data, for example a history of block motion phase values updated by the DCU 42, there are as many registers as there are blocks per field, to enable block-based detection.

For each block, the FMD 43 detects a film mode by searching for cadence patterns in each history of block motion phase values. If a film mode in detected in a block, a film mode flag corresponding to this block is set. Blocks identified as resulting from a conversion from a film format may be deinterlaced by the DEI by a simple merging of fields.

In addition, it is advantageous to have a still mode detector or SMD (not represented). For each block, the SMD sets a still image flag when an absence of motion is detected for the block. The value of this flag is sent to the DEI to indicate that deinterlacing may be done in a relatively simple manner.

Motion detector: The motion detector 41 uses comparisons of fields, and applies various metrics for this purpose. However, even with identical fields, the measured differences could be non-zero due to noise. It is advantageous to use a motion detector capable of operating with signals that have multiple levels rather than simple binary signals. In other words, it is preferable to work with motion probabilities rather than with a simple indication of the presence or absence of motion.

In addition, in order to reduce the number of detection errors in zones without motion, the motion detector 41 may comprise a low-pass filter (not represented) for the luma pixels or LLPF (luma low-pass filter). This filtering of the input may be insufficient, particularly when the contrast is relatively low. Empirically determined threshold values may be introduced to reduce the rate of erroneous detections. These variable threshold values may also be made to be a function of an estimate of the image contrast and noise. Thus, if objects have little contrast, the threshold values may be relatively low. Motion is then detectable even for relatively low metric values or metric differences. These values may also be made to vary as a function of the size of the luminance values (8 bits or 10 bits).

In the embodiment illustrated in FIGS. 3 and 4, the BBD (block-based sum of the luma differences) and CFD (consecutive field difference) metrics are used.

The x, y indices are respectively used for columns and rows to define the position of a pixel in a field. The fields have their own index n. Motion metrics are calculated for each pixel located at a position (x,y) in a field n. To clarify, we will call A(x,y,n), B(x,y,n), C(x,y,n) and D(x,y,n) the respective filtered values of the luminance pixels F(x,y,n+1), F(x,y,+1,n), F(x,y−1,n) and F(x,y,n−1), from which the comparisons between fields are made.

The BBD and CFD metrics are thus defined by:

$$BBD = \sum_{block} |A - D|, \quad (1)$$

and $$CFD = \sum_{block} \text{MIN}(|A - B|, |A - C|). \quad (2)$$

In general, for cadence detection in a part of a field, the sum of the absolute differences between A(x,y,n) and D(x,y,n) is calculated for the entire part of the field, and the sum of the minimum values MIN(|A−B|,|A−C|) is calculated for the entire part of the field:

$$BBD = \sum_{part} |A - D|$$

$$CFD = \sum_{part} \text{MIN}(|A - B|, |A - C|)$$

In field-based cadence detection, not represented, the sums for the blocks in the field of the BBD and CFD metrics respectively calculated using relations (1) and (2) may be calculated. Blocks of 80×80 pixels may be used for example.

In addition, the motion metrics M12, M23 and M13 are respectively defined as the motion between the previous field (n−1) and current field (n), between the current field (n) and next field (n+1), and between the previous field (n−1) and next field (n+1). M12 is the calculated sum, for the previous field (n−1), and for the entire part of the field or the entire field, of the minimum values MIN(|A−B|,|A−B|) exceeding a noise threshold. M13 is the calculated sum, for the current field (n), and for the entire part of the field or the entire field, of the absolute differences between A(x,y,n) and D(x,y,n). M23 is the calculated sum, for the current field (n), and for the entire part of the field or the entire field, of the minimum values MIN(|A−B|,|A−C|) exceeding the noise threshold.

In this embodiment, the values of M12, M23 and M13 are then used to determine the value of a programmable threshold $$k\_cfd: \text{If } \frac{M12}{M13} > k\_cfd3,$$

where the threshold k_cfd3 has the value of 0.6 for example, then the programmable threshold d_cfd is given the value of a threshold k_cfd1, for example 2.1. Otherwise the programmable threshold k_cfd is given the value of a threshold k_cfd2, for example 1.1.

In one variation, the following test is instead used for setting the value of the threshold k_cfd: If $$\frac{M12 + M23}{M13} > k\_cfd3,$$

the threshold k_cfd is given the value k_cfd1. Otherwise the threshold k_cfd is given the value k_cfd2. The programmable threshold k_cfd may then be used to determine the motion phase value for the part of the field, using a test such as the following: If $$\frac{M12}{M23} > k\_cfd$$

then bMove=0, else bMove=1. The bMove bit is called the motion bit. The bMove bit represents the motion between two successive fields.

It is also advantageous to use a representation of the motion between two fields which both have even or odd indices, such as a field (n−2) and a field (n). This representation comprises a bRepeat bit for which the value is estimated from comparisons between the pixels A(x,y,n) and D(x,y,n). For example, the bRepeat bit is set if the BBD for that part of the field is less than a threshold t_repeat, representative of a repeat between field (n−2) and field (n).

In field-based cadence detection, the BBD and CFD metrics may be calculated for each block of 80×80 pixels using relations (1) and (2). The BBD for each block of 80×80 pixels is compared to the t_repeat threshold. One bRepeat bit is set for the entire field if and only if all the BBDs are less than the t_repeat threshold. The motion phase thus determined for this part of the field or this field P(n) is a vector comprising the bMove and bRepeat bits for this part of the field or for this field. In block-based detection, the block motion phase B(n) for each block is a vector comprising the bMove and bRepeat bits for the block.

Control and status registers: The control unit (labeled 44 in FIG. 4) stores a certain number of registers usable by the DCU 42 and the FMD 43. The following table represents the cadence registers stored in this manner:

| Size | Name | Description |
|---|---|---|
| 1×40 bits | tbMove | 1 if motion detected between two successive fields |
| 1×40 bits | rbSkip | 1 if previous field skip command |
| 1×40 bits | tbRepeat | 1 if no motion detected between two fields which both have even or odd indices |
| 1 bit | bFilmMode | 1 if film mode |
| 8 bits | ucPattern | Pattern index |
| 8 bits | ucPhase | Cadence phase index |

For each block, there is a set of registers comprising a tbMove register, a bFilmMode register, a ucPattern register, and a ucPhase register. These last three registers are double-buffered, so that their value for a previous field may be used while their value for the current field is being written.

The control unit also stores, for each cadence pattern, a set of cadence pattern registers comprising the registers ucLength, ucDelay and tbPhase. These registers are described below.

Detection Control Unit (DCU): For each block, the DCU controls the cadence detection by using the value of the block motion phase B(n) calculated for the current field (n). The DCU updates the tbRepeat, tbMove and tbSkip cadence registers, having 40 bits for example. These registers are stored in the control unit (labeled 44 in FIG. 4). There is only one tbSkip register. However there are as many tbMove and tbRepeat registers as there are blocks per field. The DCU takes into account the Vskip and Vrepeat signals which respectively signal field skip and field repeat commands.

Figure 5:
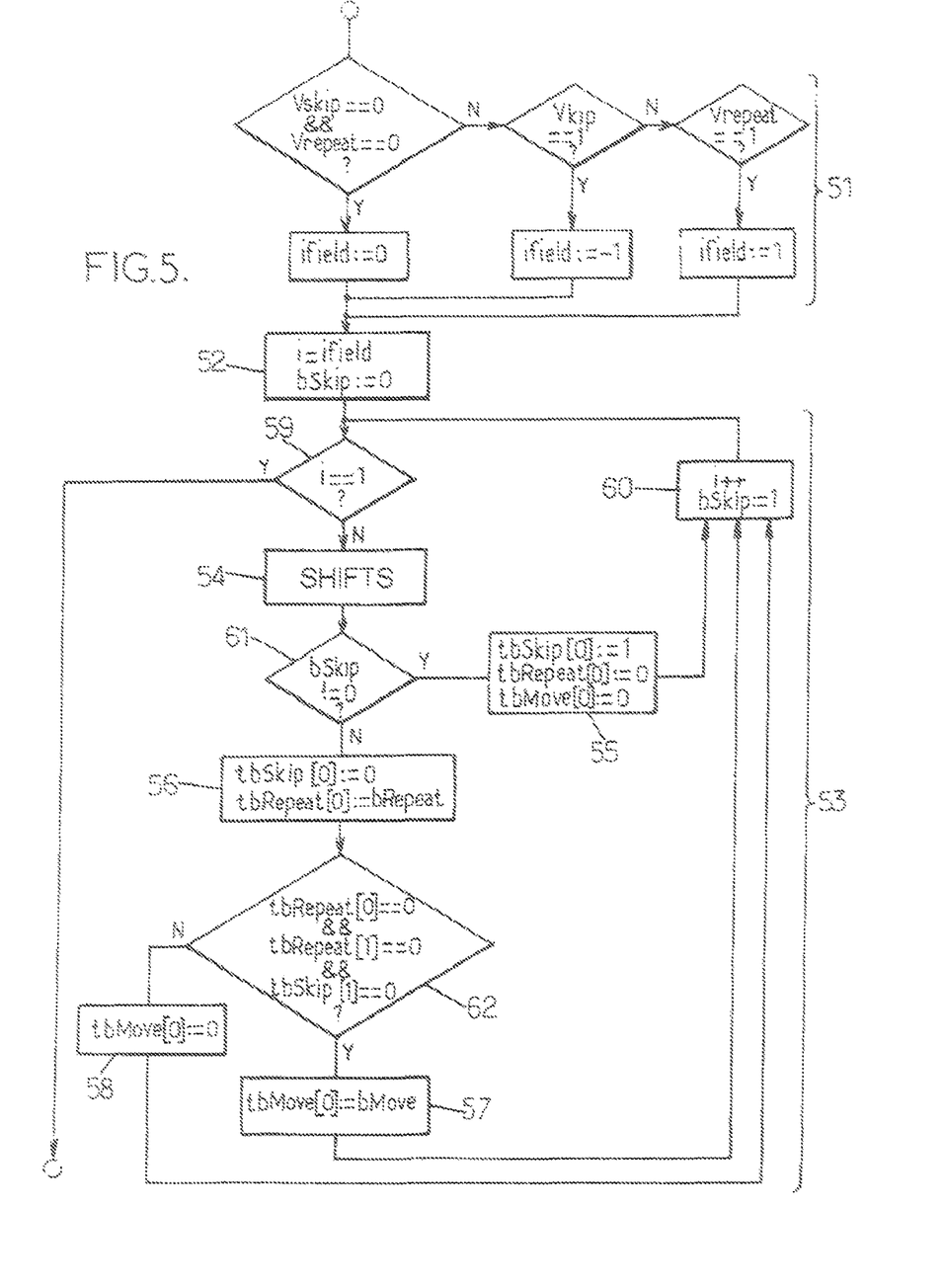
FIG. 5 is a process flowchart executable by the detection control unit represented in FIG. 4.

The flowchart in FIG. 5 shows an example of a method for updating these registers, performed for each current field. The method comprises steps, labeled 51, for assigning a value to a variable, infield, as a function of the values of the Vskip and Vrepeat signals. The infield variable assumes the value −1 of Vskip is set, 1 if Vrepeat is set, and 0 if neither of the Vskip, Vrepeat signals is set. A loop 53 is performed, indexed by a variable i initialized to the value of the infield variable (step 52). The number of iterations of the loop depends on the value of the infield variable. The value of the i variable is tested 59 and the loop 53 is not executed in the case of a field repeat command. In other words, the cadence registers tbRepeat, tbMove and tbSkip are not updated. The repeated field is therefore ignored and has no further impact on the cadence detection. If the i variable is zero, meaning no field repeat or field skip command has been applied to the current field, then the loop 53 is executed once (the incrementing and testing steps 60 and 59). If the i variable is initially equal to −1, meaning a field skip command was applied to the current field, then the loop 53 is executed twice (the incrementing and testing steps 60 and 59). During an iteration of the loop 53, the cadence registers tbRepeat, tbMove and tbSkip are shifted by one bit (step 54). If this is the first time the loop is executed (initialization and testing steps 52 and 61), then respectively written into the spaces freed by shifting the tbSkip and tbRepeat registers are a zero value and the current value of the bRepeat bit for this block (step 56). The tbRepeat register is thus updated. The tbMove register is also updated by writing the value of the bMove bit (step 57) into the space freed by the shift in step 54. It is advantageous not to perform this write if no motion is detected between the last three fields of all even or odd indices (test 62 concerning the last values of the tbRepeat register). It is then assumed that any bMove bit set to 1 indicating motion between fields is the result of a detection error and it is preferable to assign a zero value to the last bit of the bMove register (step 58). It is also advantageous not to execute the step 57 if a field skip command has been applied (test 62 concerning the next to last value of the tbSkip register). It is assumed that such a skip results in an erroneous estimation of the bMove bit in the field comparisons, and it is preferable to assign a zero value to the last bit of the bMove register (step 58). If the loop 53 is executed for the second time, meaning a field skip command was applied to the current field (steps 60 and 61), the cadence registers tbRepeat, tbMove and tbSkip in step 54 are shifted once again by one bit. These registers are thus shifted twice, due to the signaling of the field skip command. The freed bits in the tbRepeat and tbMove registers are assigned a zero value (step 55). The last bit in the tbSkip register is set (step 55). Setting this bit allows taking into account the signaling of the field skip command in a later step, typically in a search for a cadence pattern performed by the FMD.

Film Mode Detector (FMD): For each block, the FMD searches for patterns in the bits in the tbMove register. For example, in a region resulting from a 3:2 pulldown, the corresponding tbMove register may contain "10010" patterns in addition to the 0s indicating an absence of motion in the region. In a region resulting from captured video, probably no patterns will be observed as such, but sequences of "1". The table below shows a few examples of conversions and the associated patterns:

| Name | Pattern length | Pattern | Usage |
| --- | --- | --- | --- |
| "2:2" | 2 | "10" | Conversion of film frames |
| "3:2" | 5 | "10010" | Conversion of film frames |
| "2:2:2:4" | 10 | "1010101000" | DVCAM |
| "2:3:3:2" | 10 | "1010010010" | DVCAM |
| "5:5" | 10 | "1000010000" | Animation |
| "6:4" | 10 | "1000001000" | Animation |
| "3:2:3:2:2" | 12 | "100101001010" | Accelerated broadcasting to leave more time for advertisements |
| "8:7" | 15 | "100000001000000" | Japanese animation |

The pattern search uses a certain number of cadence pattern registers. For each detectable pattern there may be:
 a tbPhase register, for example a 20-bit register, for receiving said pattern, for example "10010".
 a ucLength register, for example an 8-bit register, for storing the length of the pattern, for example 5, and
 a ucDelay register, for example an 8-bit register, for storing a length parameter used in the detection delay, for example the length of the cadence bitstreams to which the contents of the tbMove register are compared bit by bit.

For each detectable conversion and for each cadence phase, the FMD generates a cadence bitstream, for example the five bitstreams "1001010010 . . . ", "0010100101001 . . . ", "010100101001 . . . ", "101001010010 . . . " and "01001010010 . . . " in the case of a 3:2 pulldown. If one of these bitstreams corresponds to the bitstream stored in the tbMove register, then a film cadence is detected. The following logic equation may be used:

bHit1=(bPhase AND bMove) OR (NOT(bPhase) AND NOT(bMove)) OR (bSkip), where bHit1 is a success bit representing the correspondence a bit match,
where bMove represents the compared bit in the tbMove register,
where bPhase is the value of the tbPhase register for a given cadence phase, taking into account the length parameter ucDelay (In other words, for a bit bMove in a given tbMove register, bPhase represents the expected value of this bit for a given cadence pattern and a given cadence phase), and
where bSkip represents the value of the bit in the tbSkip register corresponding to the compared bMove bit.

Note that if the signaling of field skip commands indicates that a skip has previously been performed, then the comparison is automatically a success (bHit1=1). The field skip commands are thus taken into account during the comparisons.

When, for a given block, all the bits in a stream of a length defined in the register ucDelay match the bits in the tbMove register for the block, then the bFilmMode flag for this block is set and an index for the pattern corresponding to the bitstream is stored in the ucPattern register for the block. The cadence phase corresponding to the given stream is stored in a ucPhase register.

Then the cadence is considered to be locked, meaning it is not sufficient for a bHit1 success bit to be zero to zero out the bFilmMode flag. A bHit2 bit is utilized as defined below.

When the bFilmMode lag is "1", the cadence pattern index and the cadence phase respectively stored in the ucPattern and ucPhase registers are use to generate the next expected bPhase bit. This expected bit is compared to a detectable motion phase in order to find any break in the cadence. The following logic equation may be used:

$$b\text{Hit2}=b\text{Hit1 OR (NOT}(b\text{MOVE}))\tag{1}$$

In other words, even if bHit1=0, if no motion is detected, a non-match is not detected. A still image is not considered as constituting a pattern break condition.

If there is a break in the cadence pattern for a block, meaning bHit2=0, the bFilmMode flag corresponding to this block is reset to zero. Film mode detection restarts for this block, with a pattern search for each cadence phase of each detectable pattern.

It is also advantageous to use the tbRepeat register storing a motion sequence between fields which have even or odd indices. For example, there may be a comparison of the two last expected motion phases read from the tbPhase register with the last value of the tbRepeat register, using the equation:

$$b\text{Hit3}=((\text{NOT}(b\text{Phase}[0])\text{AND}(\text{NOT}(b\text{Phase}[1])\text{AND} \\ b\text{Repeat OR}((b\text{Phase}[0]\text{OR }b\text{Phase}[1])\text{AND} \\ (\text{NOT}(b\text{Repeat}))\text{OR }b\text{Skip},$$

where bHit3 is a success bit representing a match at the bit level, where bPhase[0] represents the motion phase expected between the successive fields (n) and (n−1).
where bPhase[1] represents the motion phase expected between the successive fields (n−1) and (n−2), and a bRepeat value of 1 represents the absence of motion between fields which both have even or odd indices (n) and (n−2).

Note that here again, if the signaling of field skip commands indicates that a skip has previously been performed, then the comparison is automatically a success (bHit3=1). The field skip commands are therefore taken into account during the comparisons.

The value of the bHit3 bit may be used in a locking condition, for example.

It is advantageous to use prior knowledge of the source format to limit the number of cadence patterns searched for in the tbMove history. For example, if it is known that at least a part of the image originates from a film source of 50 fields per second and that the display format is also 50 fields per second, one may search solely for the 2:2 pattern.

Although preferred embodiments of the method and apparatus have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method, comprising:
receiving a first sequence of interlaced video fields at a first display rate;
performing a display rate conversion on the first sequence of interlaced video fields to generate a second sequence of interlaced video fields at a second display rate;
wherein performing comprises regularly generating at least one of a field skip command or a field repeat command so as to apply a field skip or field repeat and convert from the first display rate to the second display rate; and
detecting cadence in said second sequence of interlaced video fields based on at least one search for a cadence pattern in a sequence of bits representative of motion in at least a part of a field from one field to another in the second sequence of interlaced video fields;
wherein detecting cadence comprises receiving said at least one of the field skip command or field repeat command and adjusting the cadence detection in response to the received field skip command or field repeat command so as to account in a detected cadence for said applied field skips or field repeats that produce the second display rate.

2. The method according to claim 1, further comprising buffering the first sequence of interlaced video fields and controlling removal of the video fields from the buffer in response to the field skip or field repeat commands to effectuate the second display rate for the second sequence of interlaced video fields.

3. The method according to claim 1, wherein detecting cadence further comprises, for each field, updating the sequence of bits considered in cadence detection to account for field skips or field repeats corresponding to the field skip commands and/or field repeat commands.

4. The method according to claim 3, further comprising, for each field, comparing the sequence of bits representative of the motion to multiple bitstreams, each bitstream corresponding to a given cadence pattern and cadence phase.

5. The method according to claim 1, wherein detecting cadence further comprises, in response to receipt of a field skip command, updating the sequence of bits considered in cadence detection by shifting the sequence of bits by at least one bit to produce an open bit space and filling the open bit space with an arbitrarily selected bit.

6. The method according to claim 1, wherein detecting cadence further comprises, in response to receipt of a field repeat command, updating the sequence of bits considered in cadence detection by preventing an update to said sequence of bits until receipt of a next frame.

7. A method, comprising:
performing a conversion of a sequence of interlaced video fields to generate a sequence of progressive video fields by deinterlacing the sequence of interlaced video fields;
regularly generating at least one of a field skip command or a field repeat command to convert the sequence of interlaced video fields from a first display rate to a second display rate through the application of a field skip or field repeat to the sequence of interlaced video fields; and
detecting cadence patterns in a sequence of bits representative of motion in at least a part of the field from one field to another in the sequence of interlaced video fields at the second display rate,
wherein detecting further comprises using said field skip command or field repeat command to correct the cadence pattern detection so as to account for field skips or field repeats within said sequence of interlaced video fields at the second display rate.

8. A processing system, comprising:
a display rate conversion process operable to convert a received first sequence of interlaced video fields at a first display rate to a second sequence of interlaced video fields at a second display rate in response to at least one of a field skip command or a field repeat command;
a cadence detection process operable to search for cadence patterns in a sequence of bits representative of motion in at least a part of the field from one field to another in the second sequence of interlaced video fields in order to detect cadence patterns,
said cadence detection process further operable to respond to said field skip command or field repeat command by adjusting the cadence detection so as to account for a presence of field skips and field repeats within said second sequence of interlaced video fields at the second display rate.

9. The processing system according to claim 8, further comprising a deinterlacing process operable to deinterlace the second sequence of interlaced video fields, said deinterlacing process operable in response to detected cadence patterns generated by the cadence detection process.

10. The processing system according to claim 8, wherein the display rate conversion process further comprises:
a flow control loop operable to adapt field sequence format to a reference format, and
wherein the flow control loop is arranged to generate said field skip or repeat commands for introducing field skips or field repeats that effectuate a change from the first display rate to the second display rate.

11. The processing system of claim 8 wherein the processing system is a component of a television set.

12. The processing system of claim 8 wherein the processing system is a component of a digital television decoder.

13. A method, comprising:
signaling of skip or repeat commands;
using the signaled skip or repeat commands to change a first sequence of video fields having a first display rate to a second sequence of video fields having a second display rate;
detecting cadence patterns in said second sequence of video fields based on at least one search for a cadence pattern in a sequence of bits representative of the motion in at least a part of a field between one field and another field in the second sequence of video fields; and wherein detecting comprises using the signaled skip or repeat commands to make a correct cadence pattern detection in the second sequence of video fields which is unaffected by field skips or repeats applied in response to the signaled skip or repeat commands and present within the second sequence of video fields at the second display rate.

14. The method of claim 13 wherein said signaling is applied to each field in the sequence.

15. The method of claim 13 wherein said signaling is applied periodically, at a certain frequency rate, to fields in the sequence.

16. The method of claim 13 wherein using said signaled skip or repeat commands comprises adjusting data considered in the search for a cadence pattern based upon receipt of signaled skip or repeat commands.

17. The method of claim 13 wherein said signaled skip or repeat commands comprise a field control command which causes a repeating or deleting of a field in the field sequence for the purposes of stream regulation.

18. The method of claim 13 wherein first and second display rates are different rates selected from the group consisting of 50 fields per second and 60 fields per second and the first and second sequences of video fields are sequences of interlaced video fields.

19. The method of claim 13 wherein the repeat command comprises a field repeat command, and using the field repeat command in detecting cadence comprises inhibiting cadence detection in response to the first repeat command for a current field and continuing cadence detection for a next field.

20. The method of claim 13 wherein the skip command comprises a field skip command, and using the field skip command in detecting cadence comprises skipping cadence detection for a current field.

* * * * *

UNITED STATES PATENT AND TRADEMARK OFFICE
CERTIFICATE OF CORRECTION

PATENT NO. : 8,243,195 B2  Page 1 of 1
APPLICATION NO. : 11/761184
DATED : August 14, 2012
INVENTOR(S) : Frankie Eymard et al.

It is certified that error appears in the above-identified patent and that said Letters Patent is hereby corrected as shown below:

In the Specification:
    At column 2, line number 51, replace [steam] with -- stream --.
    At column 3, line number 41, replace [detecting] with -- deleting --.
    At column 4, line number 8, replace [detection] with -- detections --.
    At column 4, line number 36, replace [act] with -- set --.
    At column 4, line number 49, insert -- or histories -- before "to bitstreams.".
    At column 5, line number 39, replace [DRAWING] with -- DRAWINGS --.
    At column 5, line number 47, insert -- a -- before "processing".
    At column 6, line number 9, replace [load] with -- lead --.
    At column 6, line number 35, replace [video fields form an interlace format] with -- video fields from an interlaced format --.
    At column 6, line number 56, delete the word "a" before "create".
    At column 7, line number 56, replace [This] with -- The --.
    At column 8, line number 13, replace [film mode in detected] with -- film mode is detected --.
    At column 9, line number 22, replace the equation [MIN(|A-B|, |A-B|)] with -- MIN(|A-B|, |A-C|) --.
    At column 9, line number 38, replace [d_cfd] with -- k_cfd --.
    At column 10, line number 26, replace [rbSkip] with -- tbSkip --.
    At column 10, line numbers 54, 55, 58, and 60, replace [infield] with -- ifield --.
    At column 10, line number 55, replace [value -1 of] with -- value -1 if --.
    At column 12, line number 39, replace [lag] with -- flag --.
    At column 12, line number 41, replace [use] with -- used --.

In the Claims:
    At column 14, claim number 8, line number 39, insert -- pattern -- after "cadence".

Signed and Sealed this
Twentieth Day of November, 2012

David J. Kappos
*Director of the United States Patent and Trademark Office*